Patented Aug. 26, 1952

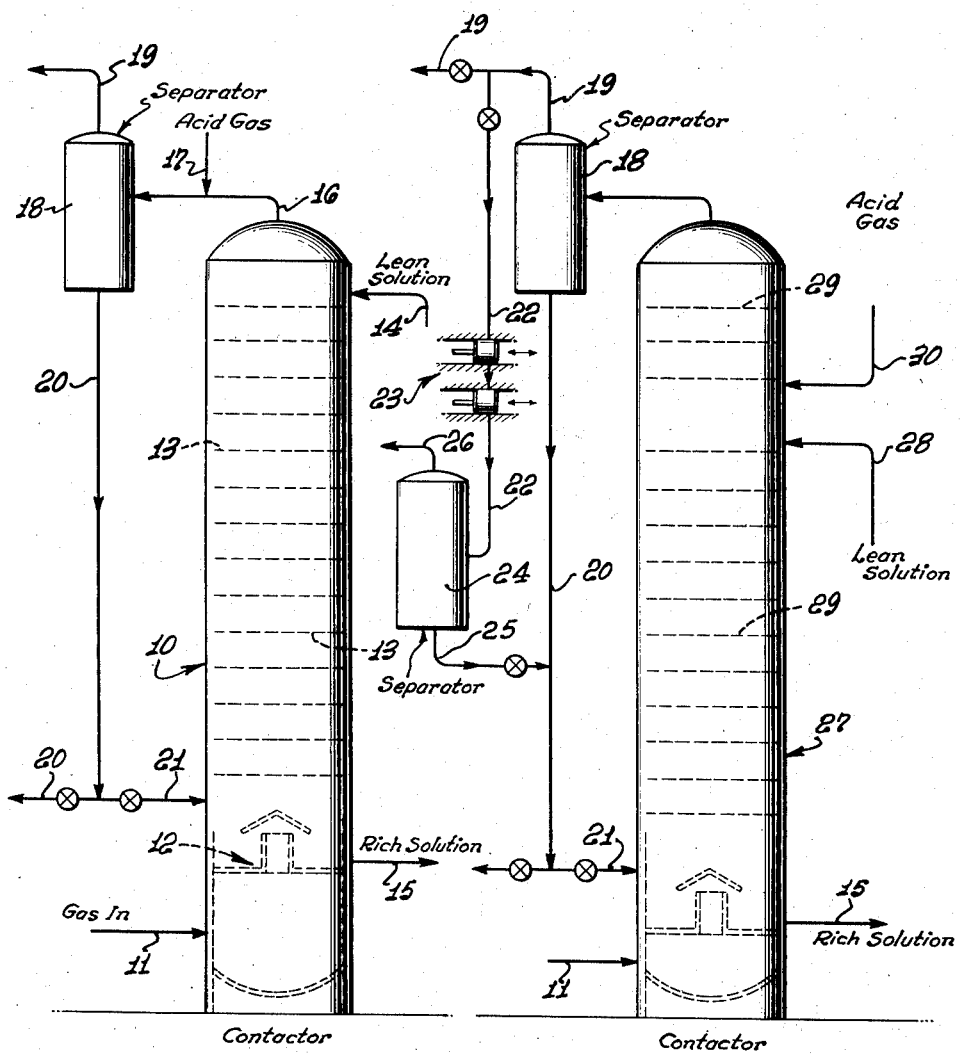

2,608,461

UNITED STATES PATENT OFFICE 2,608,461

PREVENTION OF AMINE LOSSES IN GAS TREATING SYSTEMS

Henry D. Frazier, Alhambra, Calif., assignor to The Fluor Corporation, Ltd., Los Angeles, Calif., a corporation of California Application March 26, 1949, Serial No. 83,738

4 Claims. (Cl. 23—2)

This invention has to do generally with improvements in gas treating processes employing liquid amine solutions reactive with acidic constituents of the gas to free the latter principally from corrosive impurities, and is directed particularly to new methods for the prevention of amine losses from the treating system, and undesirable amine accumulations in the gas transmission lines.

In the usual gas treating systems employing amine-containing solutions for the purpose of removing the acidic constituents from gas streams, and also in some systems for dehydration of the gas stream, the last contact of the gas with the lean solution serves to equilibrate the gas stream with the amine in the solution. This equilibration results in the introduction into the gas stream of a definite amount of the amine along with some of each of the other constituents of the solution. This amount of the amine ordinarily is lost to the plant operations. Lowered temperatures in the pipe line leading from the plant may cause some amount of the material to be condensed in the pipe. This condensation results in a drop of the efficiency of the pipe line, especially since it is mixed with foreign matter from the pipe and is spread along a great length of the line. The amount not condensed is lost entirely and is nonrecoverable by present methods.

In accordance with the invention, the amine ordinarily lost is recoverable for return and reuse in the plant, all by a simple and effective procedure. In presently operating commercial plants using for example a solution of approximately 20% monoethanolamine, 5% water and 75% diethylene glycol, the solution is so efficient in treating the gas for the removal of acid gas constituents, that unless the plant is overloaded, there may be no appreciable carbon dioxide or hydrogen sulfide in the effluent gas. Overloading the plant to the point that it will pass carbon dioxide, will also cause the passage of an undesirable amount of hydrogen sulfide. I have discovered that if an acidic compound be injected into the gas stream after its last contact with the lean amine treating solution, the acidic compound will combine with the amine entrained (either as liquid or vapor) in the gas, with resultant formation of a compound having a molecular weight much higher than the amine, and having also a correspondingly lower vapor pressure. To illustrate, and assuming carbon dioxide to be added to the gas stream treated with a solution containing monoethanolamine having a molecular weight of 61.1, the entrained amine is converted to monoethanolamine carbamate having a molecular weight of 166.2 and a far lower vapor pressure. This heavier compound then is precipitated and may be removed from the gas by any of the methods later described. Ordinarily the acidic compound will be injected in amounts between $\frac{1}{1000}\%$ and $\frac{1}{10}\%$ of the gas stream to which it is added.

It will be understood that the invention contemplates the use and recovery of any of the normally liquid amines reactive with acidic constituents of the gas being treated. Typically, the usable amines are included in the aliphatic amines, in which the amino radical is attached to a carbon atom, which in turn may be attached to one or more aliphatic or straight chain groups, saturated or unsaturated, or to a saturated or unsaturated ring structure. These amines include the primary, secondary and tertiary forms, as well as members of the mono-, di-, and triamine series.

Further and broadly contemplated is the use of any suitable acidic compound, preferably a gas, for reaction with amine entrainment carried by the gas stream. Illustrative acidic compounds are sulfur dioxide, hydrogen chloride, carbon disulfide, acetic acid and formic acid. Because however of such considerations as greater facility in use, fewer corrosion difficulties and the capacity of the reaction product for simple regeneration, I preferably employ carbon dioxide as the acidic additive.

All the various features and objects of the invention, as well as the details of certain illustrative embodiments, will be more fully understood from the following description of certain illustrative methods as shown by the accompanying drawing, in which:

Fig. 1 is a general view showing diagrammatically a conventional gas treating contactor, with provision made for reacting amine-carry-over from the column with acid gas, as will appear; and Fig. 2 is a view similar to Fig. 1 illustrating a variational embodiment of the invention.

Any gaseous mixture containing an acidic constituent, typically hydrocarbon natural gas or refinery gases containing either or both carbon dioxide and hydrogen sulfide, is fed to the contactor column 10 through the inlet line 11. The gas flows upwardly through the chimney draw-off tray 12 and then through liquid and gas contacting means such as the diagrammatically indicated bubble cap trays 13 to the top of the column, in intimate mixture with the down-flowing lean amine solution introduced to the column through line 14. The rich solution, containing absorbed acidic constituents of the gas is removed from the base of the column through line 15 to be regenerated in the usual still (not shown) and returned to the contactor through line 14. The lean absorbent solution may consist of an aqueous amine solution containing say from 10–75% aliphatic amine (e. g. monoethanolamine) in water, or a combination amine-glycol solution containing say from 50 to 80% glycol, 15 to 40% amine and around 5 to 20% water.

As previously indicated, the gas leaving the column through line 16 may contain appreciable quantities of entrained amine carried over from the top tray of the column, and which is desirably recoverable from standpoints both of preventing undesirable accumulations in the gas line, and of avoiding the loss of valuable amine. In accordance with the invention I introduce to the gas stream that has left the circulated amine solution in the column, an acidic compound, preferably an acid gas, reactive with the entrained amine to convert the latter to a relatively high molecular weight, low vapor pressure compound readily recoverable and separable from the treated gas. The preferred acidic additive is carbon dioxide which may be introduced through line 17 to the gas stream flowing through pipe 16, the proportion of carbon dioxide thus introduced being sufficient to effectively convert the entrained amine to the relatively low vapor pressure carbamate. The resulting mixture may be passed into a separator 18 from which the treated gas leaves through line 19, and from the base of which liquid entrainment including the carbamate, is withdrawn through line 20. It will be understood that the separator 18 may be placed in the treated gas line 16 at any location however remote from the contactor 10. If desired, the carbamate may be recovered and subjected to regeneration along with the amine solution circulated through the contactor. Accordingly, the liquid recovered in line 20 may be returned to the gas-treating cycle at any appropriate location, as through line 21 to the base of the contactor and into the rich solution going to the still.

In some instances it may be desirable to recover from the treated gas leaving the contactor, liquid entrainment or condensate including the carbamate at some location in the gas distribution system following its compression. Accordingly, in Fig. 2, the gas stream beyond the separator 18 is shown to be passed through line 22 into conventionally illustrated compressors 23 into a second separator 24 from the base of which the removed liquid, including the carbamate, is directed through line 25 for further disposal or return to the contactor by way of lines 20 and 21. The dry treated gas is discharged from separator 24 through line 26.

Whereas in the Fig. 1 embodiment of the invention, carbon dioxide is introduced to the gas flowing from the contactor, it is contemplated that if desired, such admixture of the gas with the acidic additive may be effected in the contactor itself at a location above the departure of the gas stream from the circulated amine absorbent. Thus as shown in Fig. 2 the lean solution may be introduced to the contactor 27 through line 28 at a location below the top of the column a distance sufficient to accommodate a number of baffles or trays 29 below which the carbon dioxide is introduced through line 30. Here the function of the top trays 29 is primarily to effect intimate admixing of the main gas stream with the added carbon dioxide to a degree sufficient for conversion of substantially all the amine entrained in the gas from the entering lean solution, to the carbamate. As it accumulates on the top trays 29, the carbamate drains down in the column to join the down flowing lean solution, and ultimately becomes regenerated in the still.

Other processes having for their object the minimizing of amine losses from the contactor in this type of gas treating process, are disclosed in a copending Frazier and Kohl application Ser. No. 83,739, filed March 26, 1949, on Systems for the Treatment of Gases, and the Frazier and Riesenfeld application, Ser. No. 83,740, filed March 26, 1949, on Amine Absorbent Gas Treating Systems.

I claim:

1. The method that includes passing downwardly through a contacting zone a solution of a liquid amine in contact with a gas stream flowing upwardly through the zone and containing carbon dioxide reactive with the amine, and introducing carbon dioxide to the gas stream after it has left said solution to convert amine entrained in the gas to a relatively high molecular weight and low vapor pressure reaction product, and heating the reaction product to recover the amine.

2. The method of preventing amine loss in a gas stream passed upwardly through and out of a contactor column in contact with a down-flowing solution of a liquid amine reactive with an acidic constituent in the gas and introduced to an upper location in said column, that includes introducing carbon dioxide to the gas stream after its passage through said column to convert the amine to a relatively high molecular weight and low vapor pressure reaction product.

3. The method of preventing amine loss in a gas stream passed upwardly through and out of a contactor column in contact with a downflowing solution of a liquid amine reactive with carbon dioxide contained in the gas and introduced to an upper location in the column below a top section thereof, that includes introducing carbon dioxide to the gas stream in said top section of the column to convert amine entrained in the gas to a recoverable relatively high molecular weight and low vapor pressure reaction product, and returning said product to the amine solution.

4. The method that includes continuously circulating a solution of a liquid amine through a heating and regenerating zone and then from an inlet downwardly through a contacting zone, passing gas containing an acidic constituent of the group consisting of hydrogen sulfide and carbon dioxide and reactive with the amine upwardly through and out of said zone in contact with the amine solution, introducing carbon dioxide to the gas treated by contact with the solution and at a location beyond said inlet to convert amine entrained in the gas to a relatively high molecular weight and low vapor pressure reaction product salt, and returning said reaction product to the circulated amine solution for heating and recovery of the amine in the heating zone.

HENRY D. FRAZIER.

REFERENCES CITED

The following references are of record in the file of this patent:

UNITED STATES PATENTS

| Number | Name | Date |
|---|---|---|
| 1,925,198 | Melvill | Sept. 5, 1933 |
| 1,934,472 | Allen | Nov. 7, 1933 |
| 1,962,525 | Richardson | June 12, 1934 |
| 2,177,068 | Hutchinson | Oct. 24, 1939 |
| 2,487,981 | Reed | Nov. 15, 1949 |